US012700818B2

(12) United States Patent
Zhen et al.

(10) Patent No.: US 12,700,818 B2
(45) Date of Patent: Aug. 4, 2026

(54) MOTOR DRIVE SYSTEM FOR A HOUSEHOLD APPLIANCE

(71) Applicant: BSH Hausgeräte GmbH, Munich (DE)

(72) Inventors: Wenhuan Zhen, Xuzhou (CN); Lei Yao, Nanjing (CN); Zhengwei Li, Nanjing (CN)

(73) Assignee: BSH Hausgeräte GmbH, Munich (DE)

( * ) Notice: Subject to any disclaimer, the term of this patent is extended or adjusted under 35 U.S.C. 154(b) by 191 days.

(21) Appl. No.: 18/597,203

(22) Filed: Mar. 6, 2024

(65) Prior Publication Data

US 2024/0305232 A1      Sep. 12, 2024

(30) Foreign Application Priority Data

Mar. 9, 2023    (CN) .......................... 202320441693.2

(51) Int. Cl.
| | |
|---|---|
| *H02P 25/18* | (2006.01) |
| *D06F 23/00* | (2006.01) |
| *D06F 34/00* | (2020.01) |
| *D06F 37/30* | (2020.01) |
| *D06F 105/46* | (2020.01) |

(52) U.S. Cl.
CPC ............ *H02P 25/188* (2013.01); *D06F 23/00* (2013.01); *D06F 34/00* (2020.02); *D06F 37/304* (2013.01); *D06F 2105/46* (2020.02)

(58) Field of Classification Search
CPC ........ H02P 25/188; H02K 3/28; H02K 19/10; H02K 15/095; H02K 3/50; H02K 9/06; D06F 34/00; D06F 23/00; D06F 37/304
See application file for complete search history.

(56) References Cited

U.S. PATENT DOCUMENTS

2021/0288566 A1     9/2021   Ji
2024/0291413 A1 *   8/2024   Morino .................... H02K 3/50

FOREIGN PATENT DOCUMENTS

KR      1020130076183 A      7/2013
WO      WO-2020082550 A1 *   4/2020   .............. H02K 3/28

* cited by examiner

*Primary Examiner* — Said Bouziane
(74) *Attorney, Agent, or Firm* — Laurence A. Greenberg; Werner H. Stemer; Ralph E. Locher

(57) ABSTRACT

A motor drive system, in particular for a laundry cleaning device, includes a controller, a motor drive module, and a motor. The motor includes a three-phase winding. Each phase winding includes at least two winding units. The motor drive module is configured to drive the motor to operate based on a control instruction of the controller. A winding switching module is respectively connected to the controller, to the motor drive module and to the motor and is configured to obtain an operating mode of the laundry cleaning device from the controller and to control a type or manner of connection of the winding units in the three-phase winding based on the operating mode.

12 Claims, 9 Drawing Sheets

MOTOR DRIVE SYSTEM FOR A HOUSEHOLD APPLIANCE

CROSS-REFERENCE TO RELATED APPLICATION

This application claims the priority, under 35 U.S.C. § 119, of Chinese Patent Application CN 202320441693.2, filed Mar. 9, 2023; the prior application is herewith incorporated by reference in its entirety.

FIELD AND BACKGROUND OF THE INVENTION

The present invention relates to the field of motor technologies, and in particular, to a motor drive system for a household appliance.

A motor used in a laundry cleaning device (for example, a washing machine or a washing and drying machine) mostly uses a variable frequency motor system with a controller and a permanent magnet synchronous motor, to achieve the purpose of adjusting a rotation speed and a torque through the controller, so that the motor system can operate at a wide range of rotation speeds and torques.

A washing machine is used as an example. A motor of the existing washing machine is usually configured with 12 slots in stators of a three-phase motor, as shown in FIG. 1. Each phase winding is composed of 4 windings 92 connected in series. Tail ends of three-phase series windings are not led out but connected together to form a common terminal, and head ends of the three-phase windings are respectively led out through terminals such as a connection point A1, a connection point B1, and a connection point C1 in FIG. 1, and may be connected to a controller 91 through wire harnesses. During operation of the motor at a high speed, deep flux-weakening control needs to be performed to achieve a required rotation speed and load, but the deep flux weakening control may result in sacrifice of some motor efficiency.

The motor system has two typical operating states: a washing state in which the motor operates at a large torque and a low rotation speed, and a dehydration state in which the motor operates at a small torque and a high rotation speed. Switching of the operating states is implemented by using different software algorithms in the controller. Due to a greater difference between the rotation speed and the load torque in the washing mode and the rotation speed and the load torque in the dehydration mode, it is also difficult to achieve high operating efficiency of the motor in the two significantly different operating modes even if the variable frequency motor system is used. In other words, it is difficult to achieve optimal efficiency during operation of the motor, because it is difficult to implement a high rotation speed of dehydration for the purpose of increasing the maximum torque of washing, or the torque of washing is reduced for the purpose of improving a dehydration effect.

SUMMARY OF THE INVENTION

It is accordingly an object of the invention to provide a motor drive system for a household appliance, which overcomes the hereinafore-mentioned disadvantages of the heretofore-known systems of this general type and which enables a motor of a home appliance, in particular of a laundry cleaning device, to satisfy requirements for rotation speeds and torques, and achieve better operating efficiency in different operating modes.

With the foregoing and other objects in view there is provided, in accordance with the invention, a motor drive system for a home appliance, in particular for a laundry cleaning device, comprising a controller, a motor drive module, and a motor, the motor includes a three-phase winding, each phase winding includes at least two winding units, the motor drive module is configured to drive the motor to operate based on a control instruction of the controller, and a winding switching module, respectively connected to the controller, the motor drive module, and the motor, and configured to obtain an operating mode of the laundry cleaning device from the controller, and control a type of connection of the winding units in the three-phase winding based on the operating mode.

The motor drive system for a home appliance, in particular for a laundry cleaning device, improves the operating efficiency of a motor of the laundry cleaning device, and enables the motor to achieve better operating efficiency in different operating modes.

An embodiment of the present invention provides a motor drive system for a laundry cleaning device by way of a possible embodiment. The system includes a controller 10, a motor drive module 11, and a motor 12. The motor 12 includes a three-phase winding 121, and each phase winding 121 includes at least two winding units 1211, 1212. The motor drive module 11 is configured to drive the motor 12 to operate based on a control instruction of the controller 10. The system further includes:

a winding switching module 13, respectively connected to the controller 10, the motor drive module 11, and the motor 12, and configured to obtain an operating mode of the laundry cleaning device from the controller 10, and control a type or manner of connection of the winding units in the three-phase winding 121 based on the operating mode.

Optionally, the operating mode of the laundry cleaning device includes a washing mode and a dehydration mode.

The winding switching module 13 is further configured to control the winding units in the three-phase winding 121 to be connected in series in the washing mode, and control the winding units in the three-phase winding 121 to be connected in parallel in the dehydration mode.

Optionally, the winding switching module 13 includes a series control module 131, a parallel control module 132, and an isolation module 133.cc The series control module 131 is configured to control the winding units in the three-phase winding 121 to implement series connection in a disabled state of the parallel control module 132.

The parallel control module 132 is configured to control the winding units in the three-phase winding 121 to implement parallel connection through the isolation module 133 in a disabled state of the series control module 131.

Optionally, the series control module 131 includes three series-connected switch units K5, K6, and K7, where each of the series-connected switch units is connected in series between two adjacent winding units in a corresponding winding.

Optionally, the isolation module 133 includes three isolation units 1331, 1332, and 1333 connected in parallel. Each of the isolation units includes two diodes D1 and D2 connected in series, a connection terminal of the two diodes D1 and D2 serves as an isolation terminal, each isolation terminal is connected to an end of the series-connected switch unit, and different isolation terminals are connected to different series-connected switch units.

Optionally, the parallel control module 132 includes three parallel-connected switch units K1, K2, and K3 and a first isolation switch unit K4.

One end of each of the parallel-connected switch units is connected to the corresponding winding and a connection terminal of the motor drive module 11, and another end of the parallel-connected switch unit is connected to another end of the series-connected switch unit of the corresponding winding.

Two ends of the first isolation switch unit K4 are respectively connected to two ends of the isolation unit.

Optionally, the parallel control module 132 further includes a second isolation switch unit K8. One end of the second isolation switch unit K8 is connected to a common terminal of the three-phase winding, and another end of the second isolation switch unit K8 is connected to the first isolation switch unit K4.

Optionally, the series-connected switch units K5, K6, and K7, the parallel-connected switch units K1, K2, and K3, the first isolation switch unit K4, and the second isolation switch unit K8 may be any one of an electronic switch or a relay.

Optionally, each winding unit includes one or more coils 1210 connected in series.

Optionally, the winding switching module 13 is mounted to a periphery of the motor 12 and close to a side of a stator of the motor, or mounted to the stator.

Optionally, solder joints 20 are disposed on the winding switching module 13, where each tap of the three-phase winding 121 is soldered to the corresponding solder joint 20.

Optionally, slots 30 are further provided on the winding switching module 13, where the tap is embedded in each of the slots 30 after being soldered to the corresponding solder joint.

Optionally, the slots 30 are in a one-to-one correspondence with the solder joints 20.

Optionally, vias 40 are further provided on the winding switching module 13, where the tap passes through each of the vias 40 and is soldered to the corresponding solder joint 20.

Optionally, the system further includes a winding switching control module 14, respectively connected to the controller 10 and the winding switching module 13, and configured to obtain the operating mode of the laundry cleaning device from the controller 10, and send a connection instruction to the winding switching module 13 based on the operating mode to control the type of connection of the winding units in the three-phase winding 121.

Compared with the prior art, the technical solution in the embodiments of the present invention has the following beneficial effects.

In the motor drive system for a laundry cleaning device provided in the present invention, through arrangement of the winding switching module respectively connected to the controller, the motor drive module, and the motor, the winding switching module controls the type of connection of the three-phase winding of the motor based on the operating mode of the laundry cleaning device, so that the type of connection of the three-phase winding better adapts to a current operating mode and satisfies requirements for rotation speeds and torques of the motor in the operating mode. In this way, the motor can satisfy the requirements for the rotation speeds and the torques in different operating modes, and achieve better operating efficiency in the different operating modes. Moreover, switching control is implemented through hardware, which ensures switching efficiency.

Further, in the washing mode, the winding switching module switches the winding units in the three-phase winding into a series connection, and in the dehydration mode, the winding switching module controls the winding units in the three-phase winding to be switched into a parallel connection, which increases an output current of an inverter, thereby increasing a power output of a three-phase motor and satisfying a requirement for a high rotation speed in the dehydration mode. In addition, different power outputs are used in different operating modes, so that the motor can achieve better operating efficiency in different operating modes of the laundry cleaning device.

Further, the above switching control function is implemented by using different switch units and isolation modules, so that implementation of the corresponding hardware is simple and reliable.

Further, the winding switching module may be mounted to the periphery of the motor and close to the side of the stator of the motor, or mounted to the stator, which may not affect a structure of the existing motor drive system and is easy to upgrade and improve the existing system.

Further, the solder joints are disposed on the winding switching module, and each tap of the three-phase winding is directly soldered to the corresponding solder joint, which can effectively reduce terminals and save costs.

Further, the slots or the vias are provided on the winding switching module, so as to conveniently fix winding taps, ensure reliability of the connection, and avoid causing an effect on surrounding components.

Further, an independent winding switching control module is disposed to implement control of the winding switching module, so that the implementation of the solution is more flexible, and the solution of the present invention can be easily implemented without modifying the controller of the existing laundry cleaning device. Therefore, the existing laundry cleaning device may be simply modified and upgraded to improve performance thereof.

Other features which are considered as characteristic for the invention are set forth in the appended claims.

Although the invention is illustrated and described herein as embodied in a motor drive system for a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

A laundry cleaning device has different requirements for torques and rotation speeds in different operating states. For example, in a washing state, a motor is required to have a large torque and a low rotation speed, and in a dehydration state, the motor is required to have a small torque and a high rotation speed. In an operation cycle of the laundry cleaning device, the washing mode in which the motor operates at a low speed occupies a larger proportion of an operation time. In order to take into account both the torque and efficiency, a motor of the laundry cleaning device is often configured to emphasize low-speed performance. In the dehydration mode that occupies a smaller proportion of the operation time, the motor needs to operate at a high speed, and a conventional control manner cannot quickly switch to high-speed operation. Therefore, a flux-weakening algorithm is needed to accelerate the motor. The so-called flux-weakening refers to weakening flux, which causes a rotation speed of the motor to exceed a rated rotation speed thereof at the expense of reduced torque. The control method causes the motor of the existing laundry cleaning device to be unable to achieve relatively high operating efficiency in two significantly different operating modes.

In view of the above problem, embodiments of the present invention provide a motor drive system for a laundry cleaning device. A winding switching module respectively connected to a controller, a motor drive module, and a motor is disposed. The winding switching module controls a type of connection of a three-phase winding of the motor based on an operating mode of the laundry cleaning device, so that the type of connection of the three-phase winding better adapts to a current operating mode and satisfies requirements for rotation speeds and torques of the motor in the operating mode. In this way, the motor can achieve better operating efficiency in different operating modes.

In order to make the above objectives, features, and beneficial effects of the embodiments of the present invention more apparent and easier to understand, specific embodiments of the present invention are described in detail below with reference to accompanying drawings.

Figure 1:
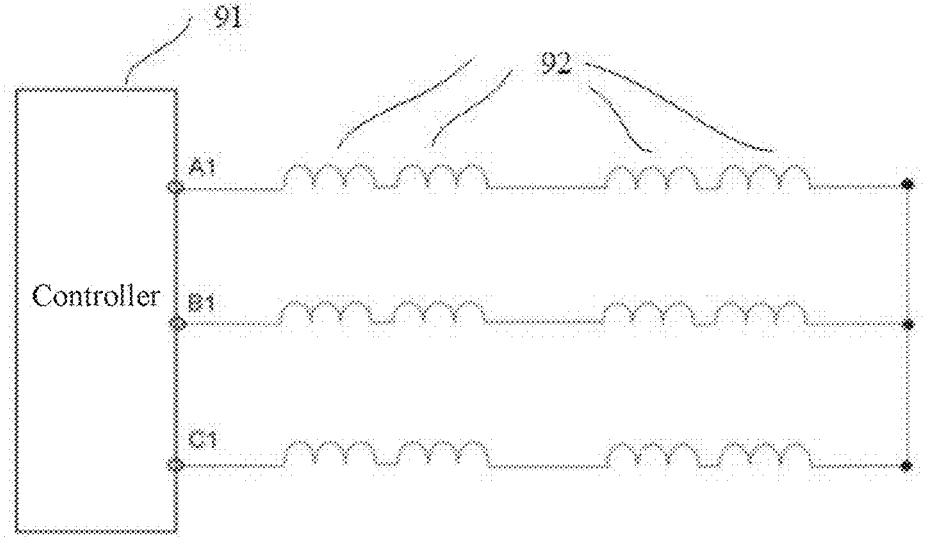
FIG. 1 is a schematic structural diagram of a winding of a motor of an existing washing machine.
Figure 2:
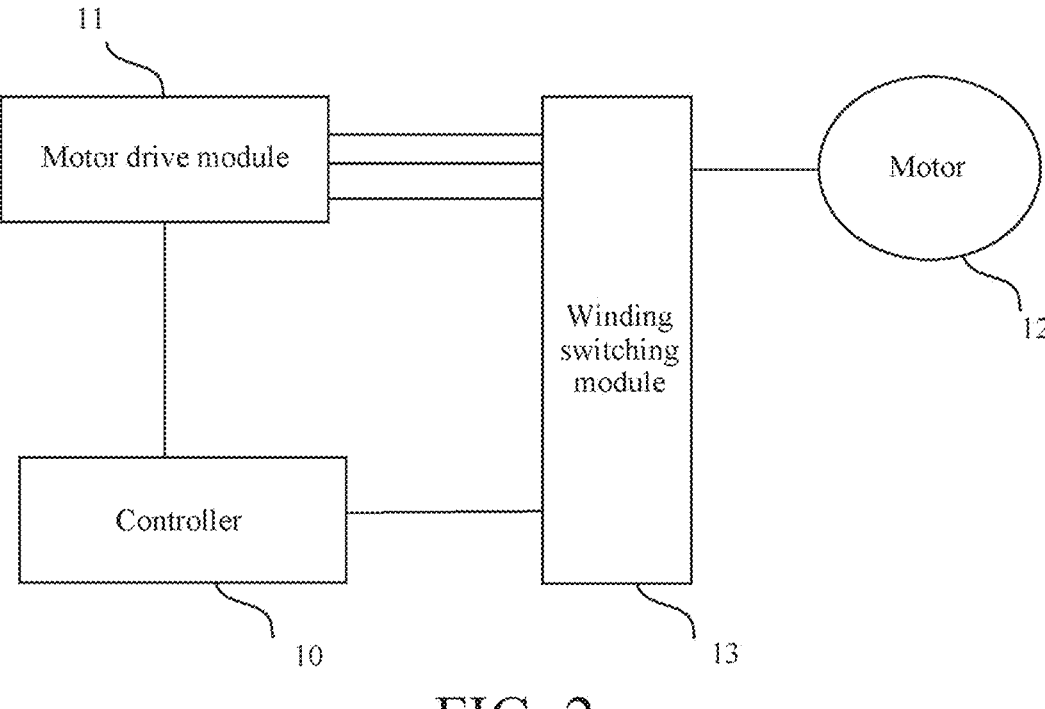
FIG. 2 is a block diagram of a motor drive system for a laundry cleaning device according to the present invention.

Referring now to the figures of the drawings in detail and first, particularly, to FIG. 2 thereof, there is seen a schematic structural diagram of a motor drive system for a laundry cleaning device according to the present invention.

The motor drive system includes a controller 10, a motor drive module 11, a motor 12, and a winding switching module 13 respectively connected to the controller 10, the motor drive module 11, and the motor 12.

Figure 3:
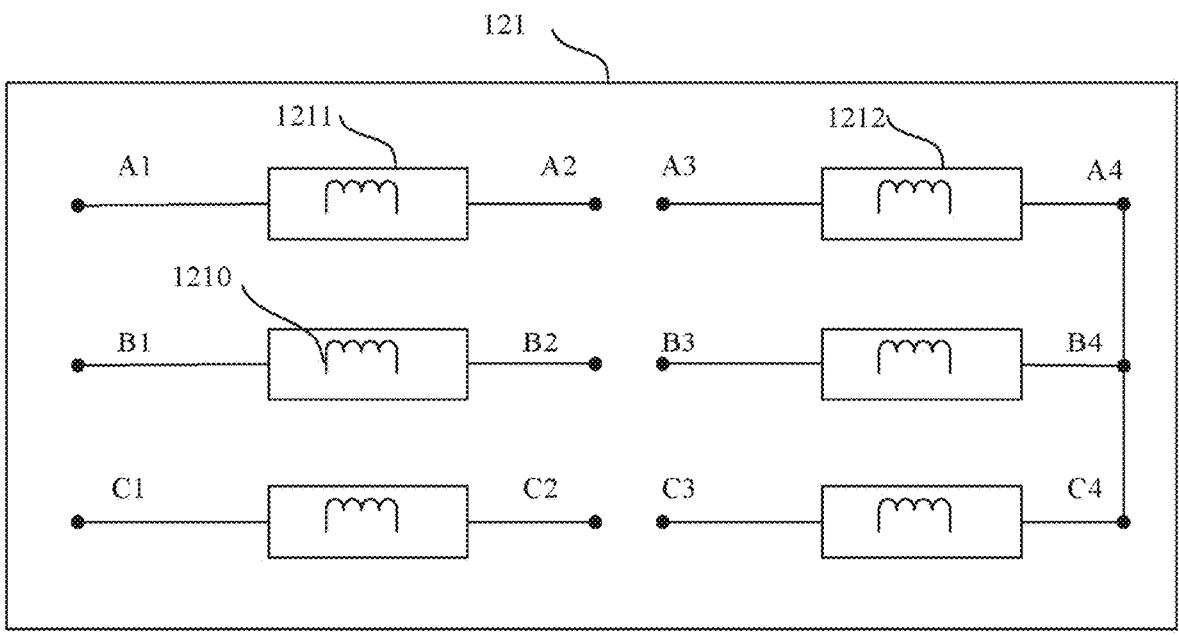
FIG. 3 is a schematic structural diagram of a three-phase winding of a motor in a motor drive system for a laundry cleaning device according to the present invention.

The motor 12 includes a three-phase winding 121. As shown in FIG. 3, each phase winding 121 includes at least two winding units 1211 and 1212.

It should be noted that in a specific application, each winding unit may include one or more coils 1210 connected in series, for example, it may include 2 or 3 coils, which is not limiting.

In the system, the motor drive module 11 is configured to drive the motor 12 to operate based on a control instruction of the controller 10. The winding switching module 13 is configured to obtain an operating mode of a washing machine from the controller 10, and control a type of connection of the winding units in the three-phase winding 121 based on the operating mode.

As shown in FIG. 3, in this embodiment of the present invention, each phase winding of the three-phase winding 121 has four terminals, such as terminals A1-A4, B1-B4, and C1-C4 shown in FIG. 3. Head ends A1, B1, and C1 are connected to the motor drive module, and tail ends A4, B4, and C4 are interconnected and serve as a common terminal.

The winding switching module 13 implements switching control of the type or manner of connection of the winding units in the three-phase winding 121 by using the terminals described above.

For example, two typical operating modes of the washing machine are a washing mode and a dehydration mode. In this embodiment of the invention, in the washing mode, the winding switching module 13 controls the winding units in the three-phase winding 121 to be connected in series, and in the dehydration mode, the winding switching module 13 controls the winding units in the three-phase winding 121 to be connected in parallel.

Certainly, in a practical application, the washing machine may also have another operating mode, and the washing mode may be divided into more detailed modes, such as modes such as soaking and gentle wash, which is not limited in this embodiment.

In the motor drive system for a laundry cleaning device provided in the invention, through arrangement of the winding switching module respectively connected to the controller, the motor drive module, and the motor, the winding switching module controls the type of connection of the three-phase winding of the motor based on the operating mode of the laundry cleaning device, so that the type of connection of the three-phase winding better adapts to a current operating mode and satisfies requirements for rotation speeds and torques of the motor in the operating mode. In this way, the motor can satisfy the requirements for the rotation speeds and the torques in different operating modes, and achieve better operating efficiency in the different operating modes. Moreover, switching control is implemented through hardware, which ensures switching efficiency.

A type of switching of the winding units is described below by using the washing mode and the dehydration mode as examples. The type of switching of the winding units in another operating mode is similar to the type of switching in these two operating modes.

Figure 4:
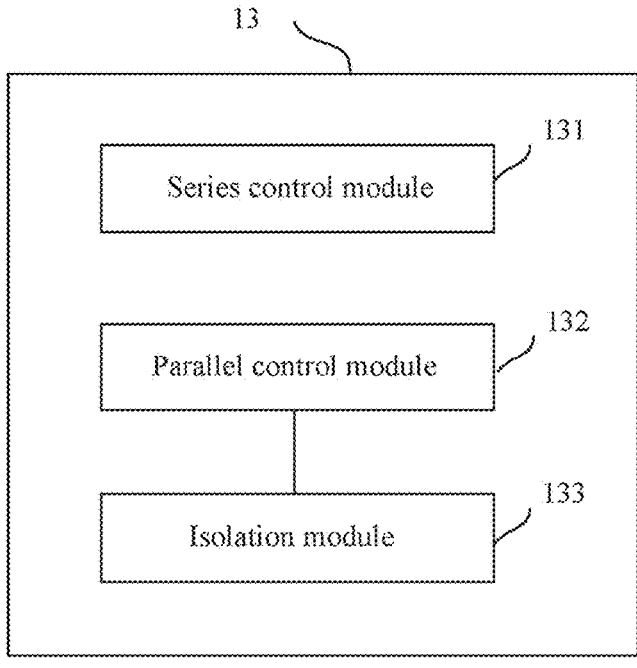
FIG. 4 is a block diagram illustrating a principle of a winding switching module in a motor drive system for a laundry cleaning device according to the present invention.

As shown in FIG. 4, an implementation of the winding switching module 13 in FIG. 2 may include a series control module 131, a parallel control module 132, and an isolation module 133.

Referring to FIG. 3 and FIG. 4 together, the series control module 131 shown in FIG. 4 is configured to control the winding units in the three-phase winding 121 to implement series connection in a disabled state of the parallel control module 132. The parallel control module 132 is configured to control the winding units in the three-phase winding 121 to implement parallel connection through the isolation module 133 in a disabled state of the series control module 131.

Figure 5:
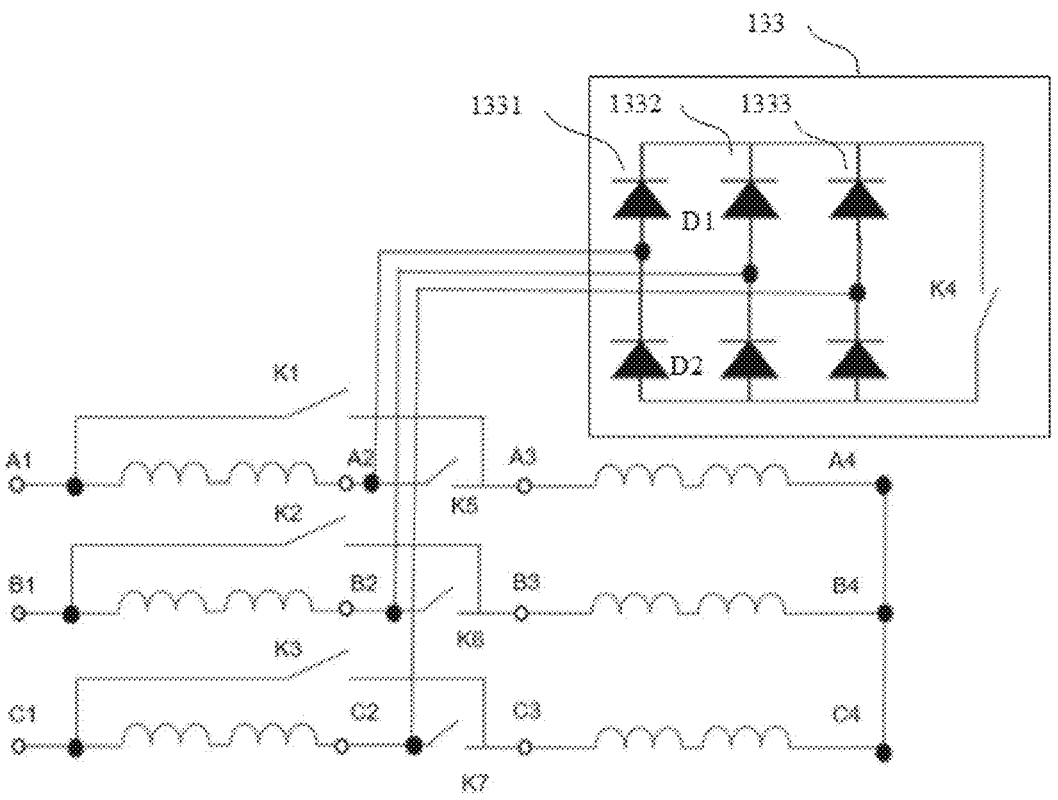
FIG. 5 is a specific schematic structural diagram of the winding switching module shown in FIG. 4.

As shown in FIG. 5, in a non-limiting embodiment, the series control module 131 in FIG. 4 may include three series-connected switch units K5, K6, and K7. Each of the series-connected switch units is connected in series between two adjacent winding units in a corresponding winding. As shown in FIG. 5, the series-connected switch unit K5 is connected between the terminal A2 and the terminal A3 of two adjacent winding units, the series-connected switch unit K6 is connected between the terminal B2 and the terminal B3 of two adjacent winding units, and the series-connected switch unit K7 is connected between the terminal C2 and the terminal C3 of two adjacent winding units.

Still referring to FIG. 5, the isolation module 133 in FIG. 4 may include three isolation units 1331, 1332, and 1333 connected in parallel. Each of the isolation units includes two diodes D1 and D2 connected in series, a connection terminal of the two diodes D1 and D2 serves as an isolation terminal, each isolation terminal is connected to an end of the series-connected switch unit, and different isolation terminals are connected to different series-connected switch units. As shown in FIG. 5, the isolation terminal of the isolation unit 1331 is connected to the terminal A2, the isolation terminal of the isolation unit 1332 is connected to the terminal B2, and the isolation terminal of the isolation unit 1333 is connected to the terminal C2.

Still referring to FIG. 5, the parallel control module 132 in FIG. 4 may include three parallel-connected switch units K1, K2, and K3 and a first isolation switch unit K4. One end of each of the parallel-connected switch units is connected to the corresponding winding and a connection terminal of the motor drive module 11, and another end of the parallel-connected switch unit is connected to another end of the series-connected switch unit of the corresponding winding. As shown in FIG. 5, the parallel-connected switch unit K1 is connected between the terminal A1 and the terminal A3, the parallel-connected switch unit K2 is connected between the terminal B1 and the terminal B3, and the parallel-connected switch unit K3 is connected between the terminal C1 and the terminal C3. Two ends of the first isolation switch unit K4 are respectively connected to two ends of the isolation unit 133.

Figure 6:
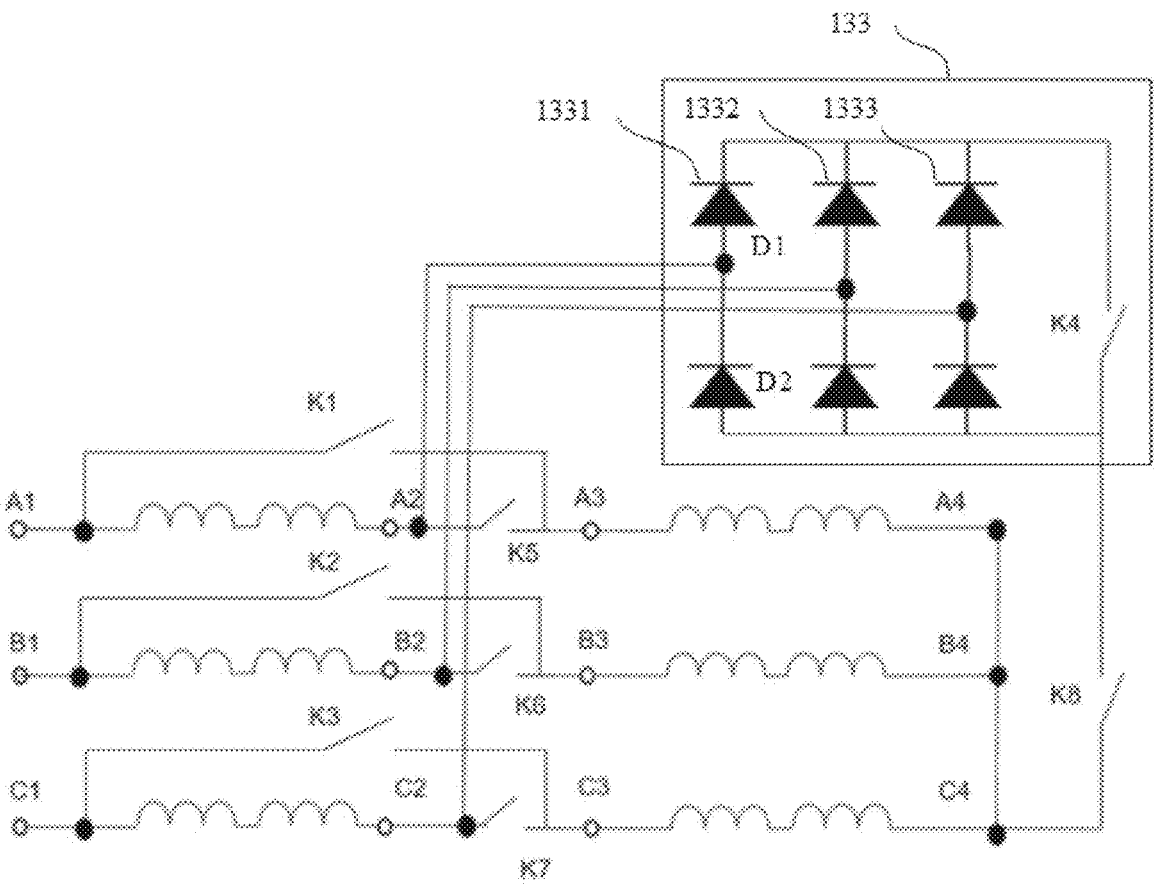
FIG. 6 is another specific schematic structural diagram of the winding switching module shown in FIG. 4.

FIG. 6 shows another specific schematic structural diagram of the winding switching module shown in FIG. 4.

A difference between the winding switching module of this embodiment and that of the embodiment shown in FIG. 5 is that, in this embodiment, the parallel control module 132 further includes a second isolation switch unit K8. One end of the second isolation switch unit K8 is connected to the common terminals (that is, the connection terminals A4, B4, and C4) of the three-phase winding, and another end of the second isolation switch unit K8 is connected to the first isolation switch unit K4.

Regardless of the embodiment shown in FIG. 5 or FIG. 6 described above, when all of the parallel-connected switch units are open and all of the series-connected switch units are closed, the winding units in the three-phase winding are connected in series. In this case, power requirements of a large torque and a low rotation speed in the washing mode may be satisfied. When all of the parallel-connected switch units are closed and all of the series-connected switch units are open, the winding units in the three-phase winding are connected in parallel. In this case, power requirements of a small torque and a high rotation speed in the dehydration mode may be satisfied.

A difference between the embodiment shown in FIG. 5 and the embodiment shown in FIG. 6 is that the winding units in the embodiment shown in FIG. 5 form a dual three-phase motor structure when being connected in parallel, and the winding units shown in FIG. 6 form a three-phase motor structure with parallel windings when being connected in parallel. Although structures are slightly different in the two types of connections, the same purpose can be achieved without switching in another manner, thereby satisfying the requirements for the torques and the rotation speeds of the laundry cleaning device in different operating modes.

It should be noted that in a practical application, the series-connected switch units K5, K6, and K7, the parallel-connected switch units K1, K2, and K3, the first isolation switch unit K4, and the second isolation switch unit K8 may be any one of an electronic switch or a relay, which is not limited in this embodiment of the invention.

In the embodiments shown in FIG. 5 and FIG. 6, each winding unit includes two winding coils connected in series.

When the motor drives a drum of the laundry cleaning device to operate in the washing mode, each phase winding of the motor is composed of four winding coils connected in series. The motor may output a larger torque at the same input current, so as to wash more laundries. When the motor drives the drum of the laundry cleaning device to operate in the dehydration mode, the coils of each phase winding of the motor are connected in series in pairs and then in parallel in pairs. The motor can achieve a higher rotation speed at the same bus voltage, thereby improving a dehydration effect. In addition, the type of connection may also reduce a flux-weakening current, thereby improving efficiency.

Through the switching of the type of connection of the winding units described above, the operating efficiency of the motor may be improved, energy consumption of the laundry cleaning device may be reduced, and an interval of the rotation speeds of the motor may be expanded, so that the motor can achieve the higher rotation speed, thereby improving the dehydration effect.

With reference to FIG. 2, in a practical application, the winding switching module 13 may be directly controlled by the controller 10. A corresponding control program is set in the controller 10, to implement control of the switch units of the winding switching module 13 based on the operating mode of the laundry cleaning device, thereby implementing the switching between the series manner and the parallel manner.

Since a significant program change process and a motor shutdown process exist during the operation of the laundry cleaning device, the switching process may be disposed in a program switching process without increasing complexity of a motor control algorithm. For example, a drainage process exists in the process from washing to dehydration. In this case, the motor may stop operating, and the switching of the type of connection of the winding units may be performed in the process. In addition, since the motor is in a shutdown state during the switching, and the switching of the switch does not occur when the switch is charged, a switching speed, an operating voltage, and an operating current required for the switch may be calculated and verified only in a stable state, which significantly reduces complexity and a price of the winding switching module.

Figure 7:
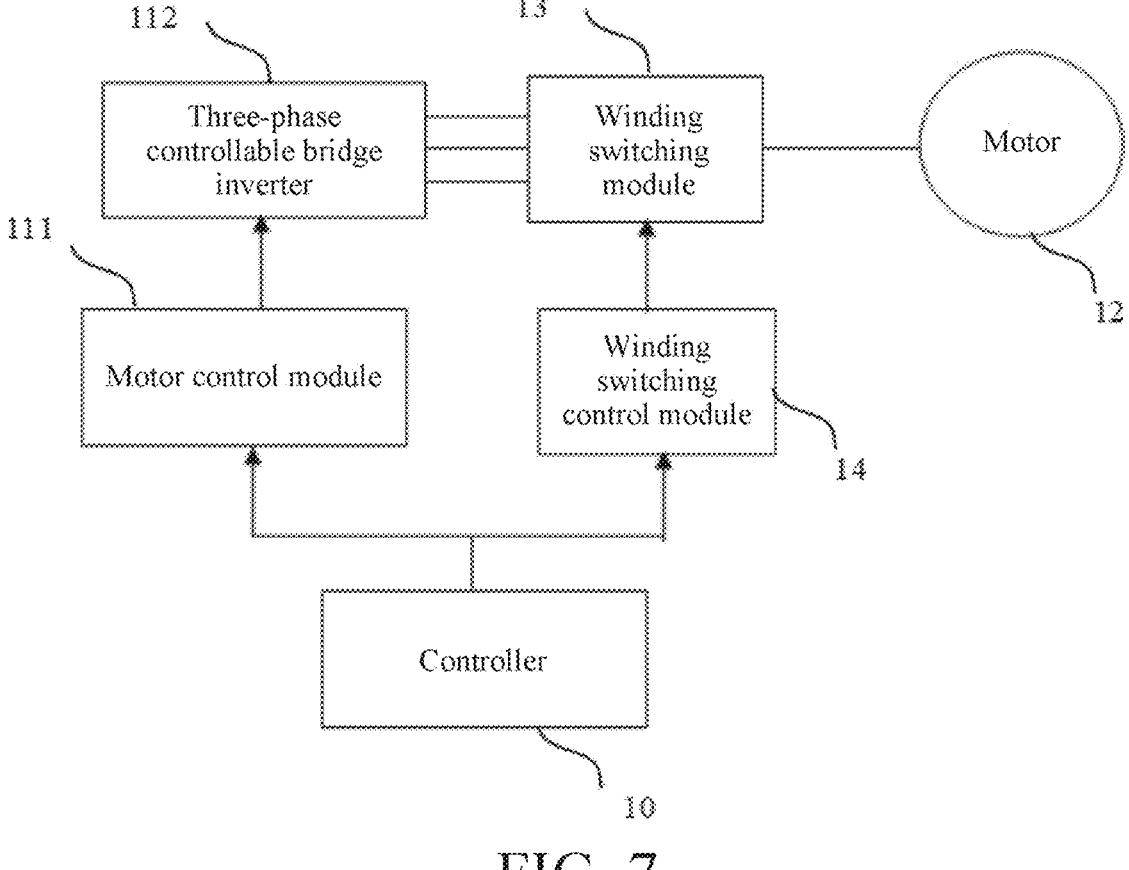
FIG. 7 is a block diagram of a motor drive system for a laundry cleaning device according to the present invention.

Further, considering that the control program of the existing controller is not changed, as shown in FIG. 7, in another non-limiting embodiment of the present invention, the winding switching control module 14 respectively connected to the controller 10 and the winding switching module 13 may further be disposed and configured to obtain an operating mode of the laundry cleaning device from the controller 10, and send a connection instruction to the winding switching module 13 based on the operating mode to control the type of connection of the winding units in the three-phase winding 121.

In this embodiment, the motor 12 is controlled by a motor control module 111 and a three-phase controllable bridge inverter 112. To be specific, the function of the motor drive module 11 in FIG. 2 is implemented by the motor control module 111 and the three-phase controllable bridge inverter 112.

During the operation of the laundry cleaning device, when the controller 10 sends an operating instruction of dehydration, the winding switching control module 14 first checks a corresponding switch state, and controls the series-connected switch unit to be open and the parallel-connected switch unit to be closed. Correspondingly, the motor control module 111 obtains a motor parameter at this moment, determines whether the parameter at this moment is a parallel parameter, and then matches the corresponding parallel parameter to control the motor 12 accordingly. Similarly, when the controller 10 sends the operating instruction of dehydration, the winding switching control module 14 first checks a corresponding switch state, and controls the parallel-connected switch unit to be open and the series-connected switch unit to be closed. Correspondingly, the motor control module 111 obtains a motor parameter at this moment, determines whether the parameter at this moment is a series parameter, and then matches the corresponding series parameter to control the motor 12 accordingly.

In the motor drive system for a laundry cleaning device provided in the embodiment shown in FIG. 7, an independent winding switching control module is disposed to implement control of the winding switching module, so that the implementation of the solution is more flexible, and the solution of the present invention can be easily implemented without modifying the controller of the existing laundry cleaning device. Therefore, the existing laundry cleaning device may be simply modified and upgraded to improve performance thereof.

In a specific application, the winding switching module 13 and the winding switching control module 14 described above may adopt the configuration of integrated circuits, and may be mounted to a periphery of the motor 12 and close to a side of a stator of the motor or mounted to the stator, or integrated into controller hardware of the motor. Certainly, the winding switching module and the winding switching control module may also be mounted independently. The mounting configuration is very flexible, which may not increase complexity of the system and does not need adjustment of configuration of a household appliance.

Figure 8:
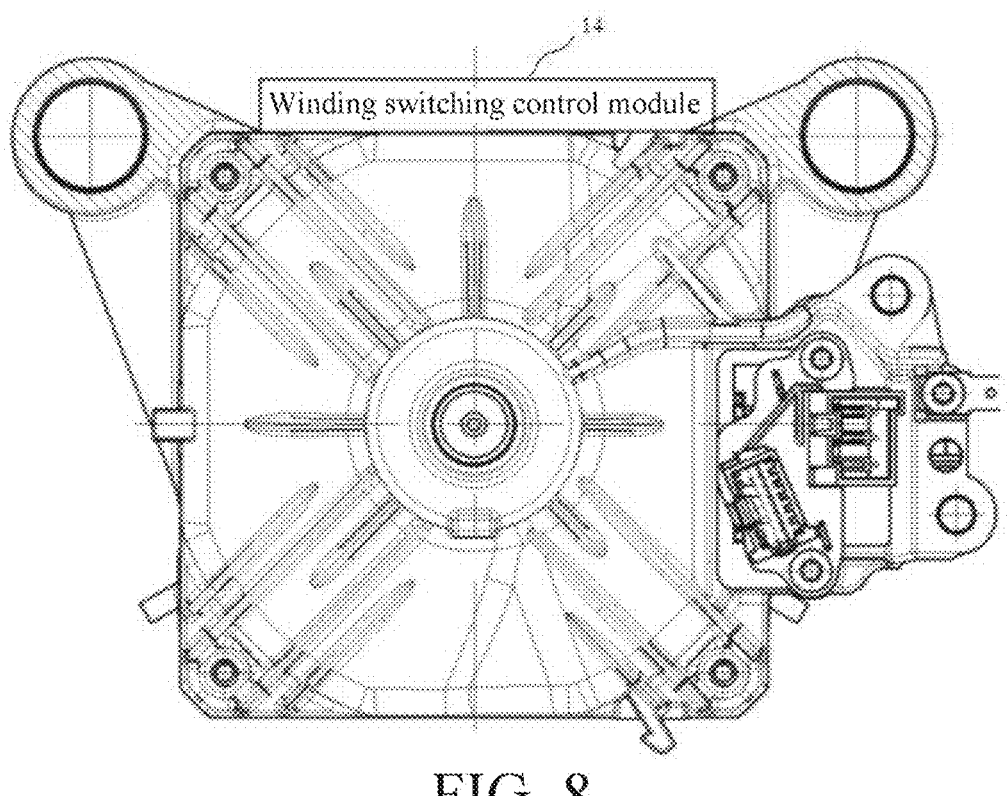
FIG. 8 is a diagrammatic, front-elevational view of a winding switching module mounted to a motor housing in a motor drive system for a laundry cleaning device according to the present invention.
Figure 9:
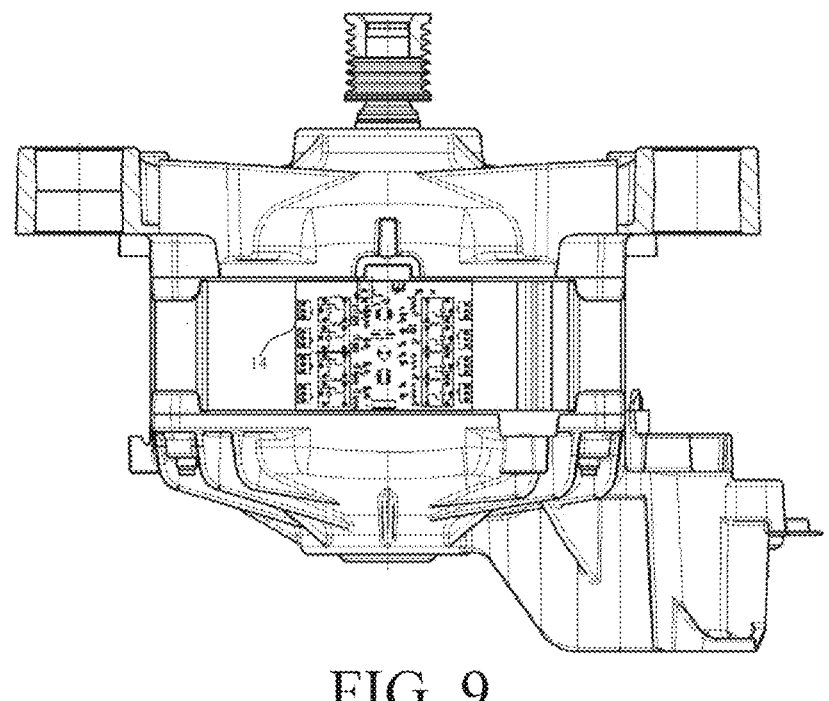
FIG. 9 is a top-plan view of a mounting of a winding switching module mounted to a motor housing in a motor drive system for a laundry cleaning device according to the present invention.

FIG. 8 and FIG. 9 are, respectively, a front view and a top view of an example in which the winding switching module 13 is mounted to a motor housing.

Further, if the above terminals are connected by using lead terminals, a quantity of terminals may be increased compared with the prior art. Therefore, in a non-limiting embodiment, each tap of the three-phase winding 121 may be directly soldered to a corresponding solder joint in a manner of arranging solder joints on the winding switching module 13, which saves terminals and leads, and can effectively reduce costs.

Figure 10:
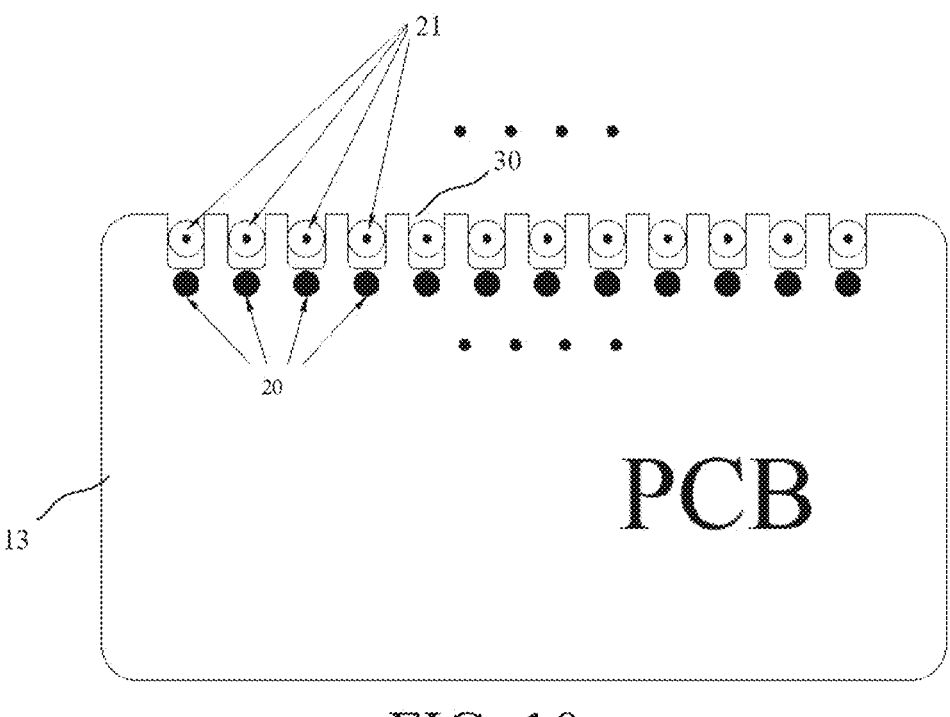
FIG. 10 is a top-plan view illustrating a type of connection of each tap of a three-phase winding and a PCB (printed circuit board) of a winding switching module in a motor drive system for a laundry cleaning device according to the present invention.
Figure 11:
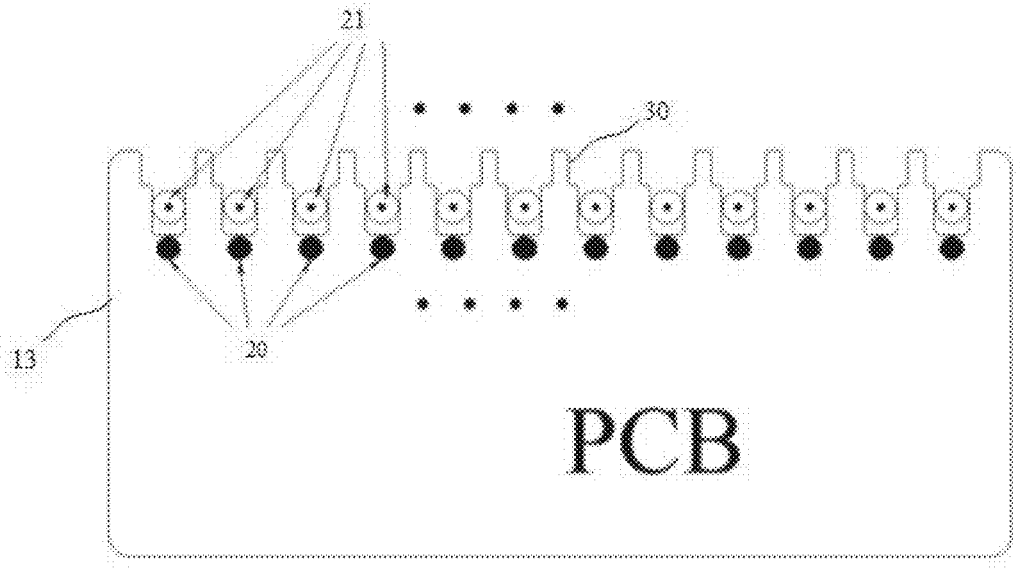
FIG. 11 is a top-plan view illustrating another type of connection of each tap of a three-phase winding and a PCB of a winding switching module in a motor drive system for a laundry cleaning device according to the present invention.
Figure 12:
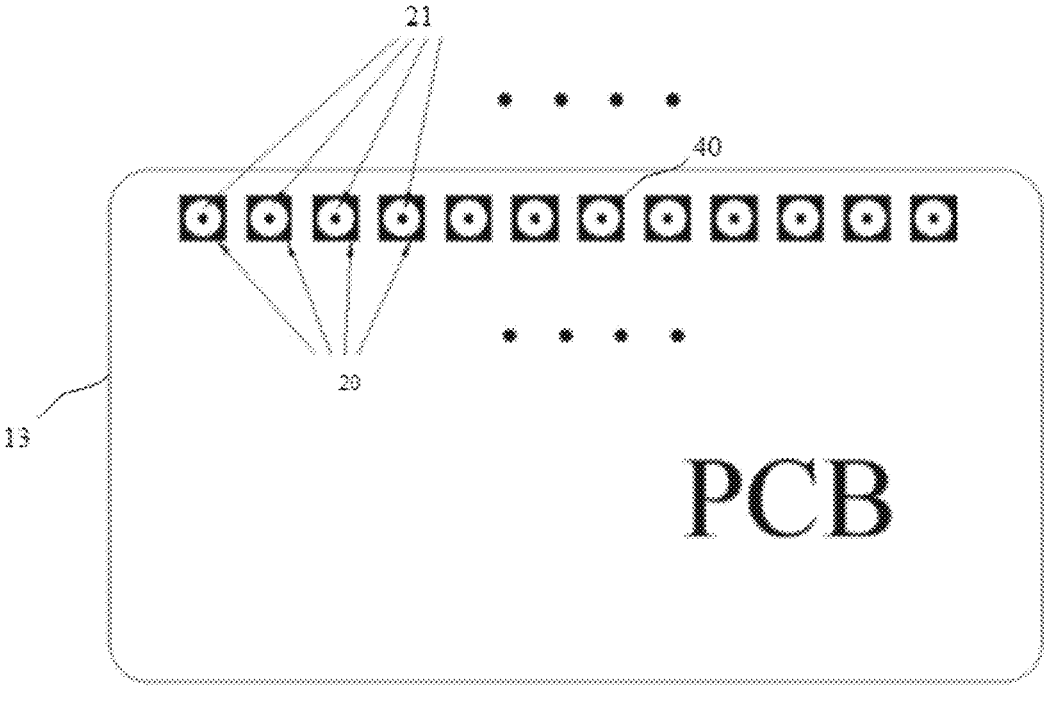
FIG. 12 is a top-plan view illustrating another type of connection of each tap of a three-phase winding and a PCB of a winding switching module in a motor drive system for a laundry cleaning device according to the present invention.

FIG. 10, FIG. 11 and FIG. 12 are diagrammatic views illustrating three different types of connections of each tap of a three-phase winding and a PCB of a winding switching module.

Solder joints 20, that is, tin plates, are disposed on the PCB of the winding switching module 13. Each tap of the three-phase winding 121 in FIG. 3, that is, an enameled wire 21, is soldered to the corresponding solder joint 20.

A difference is that in the embodiments shown in FIG. 10 and FIG. 11, slots 30 are further provided on the winding switching module 13, and each tap is embedded in each of the slots 30 after being soldered to the corresponding solder joint.

It should be noted that the slots 30 may be in a one-to-one or one-to-many correspondence with the solder joints 20, which is not limited herein. In addition, a difference between FIG. 10 and FIG. 11 is that the slots 30 have different structures. The slots 30 in FIG. 10 have a consistent diameter at the top and the bottom, while the slots 30 in FIG. 11 have a larger diameter at the top and a smaller diameter at the bottom, which is more convenient for placement and fixation of the enameled wire 21.

In FIG. 12, vias 40 are provided on the PCB of the winding switching module 13. Each tap passes through a corresponding via 40 and is soldered to the corresponding solder joint 20. The vias 40 may be in a one-to-one correspondence with the solder joints 20.

It may be seen that the solder joints are disposed on the winding switching module, and each tap of the three-phase winding is directly soldered to the corresponding solder joint, which can effectively reduce terminals and save costs. In addition, the slots or the vias are provided on the winding switching module, so as to facilitate fixation of winding taps, ensure reliability of the connection, and avoid causing an effect on surrounding components.

An electronic switch is configured as an integrated circuit, and a motor terminal and a connecting harness are canceled, which can effectively reduce costs. Moreover, a short connection line also facilitates reduction of electromagnetic interference and system interference, thereby effectively reducing interference for a motor control parameter and effect on the motor efficiency. Through the configuration scheme of the integrated circuit, a volume may be smaller.

Due to the motor drive system for a laundry cleaning device provided in the embodiments of the present invention, the switching of the type of connection of the winding units may be implemented simply and conveniently based on the operating mode of the laundry cleaning device. Under the same bus voltage, the configuration of the motor may be more flexible, which not only can satisfy the requirements for a low speed and a large torque, but also can satisfy the requirement for high-speed operation, thereby improving the overall efficiency of the motor.

Due to the solution in the present invention, the motor may achieve a higher rotation speed. The motor may adopt a smaller belt pulley configuration to implement a larger transmission ratio, so that the motor may be applied to more laundry cleaning device platforms and maintain high-efficiency operation.

Although the specific implementations have been described above, these implementations are not intended to limit the scope disclosed in the present invention, even if the same is true for a case that a single implementation is described only with respect to specific features. The feature examples provided in the present invention are intended for illustration but not limitation, unless otherwise stated. During specific implementation, the technical features of one or more dependent claims may be combined with the technical features of independent claims based on actual requirements when technically feasible, and the technical features from the corresponding independent claims may be combined in any appropriate manner, not only through the specific combination listed in the claims.

Although the present invention is disclosed above, the present invention is not limited thereto. Various alterations and modifications may be made by a person skilled in the art without departing from the spirit and scope of the present invention, and therefore the protection scope of the present invention should be subject to the scope defined by the claims.

The invention claimed is:

1. A motor drive system for a household appliance or a laundry cleaning device, the motor drive system comprising:
a controller, a motor drive module, a motor, and a winding switching module;
said motor including a three-phase winding, each phase winding including at least two winding units;
said motor drive module configured to drive said motor to operate based on a control instruction of said controller; and
said winding switching module connected to said controller, to said motor drive module and to said motor, said winding switching module configured to obtain an operating mode of the laundry cleaning device from said controller and to control a type of connection of said winding units in said three-phase winding based on the operating mode;
said winding switching module including a series control module, a parallel control module, and an isolation module;
said series control module configured to control said winding units in said three-phase winding to implement series connection in a disabled state of said parallel control module;
said parallel control module configured to control said winding units in said three-phase winding to implement parallel connection through said isolation module in a disabled state of said series control module;
said series control module including three series-connected switch units, and each of said series-connected switch units being connected in series between an adjacent two of said winding units in a corresponding winding;
said isolation module including three isolation units connected in parallel;
each of said isolation units including two diodes connected in series, forming a connection terminal of said two diodes serving as an isolation terminal;
each isolation terminal being connected to an end of said series-connected switch unit; and
different isolation terminals being connected to different series-connected switch units.

2. The motor drive system according to claim 1, wherein:
the operating mode of the laundry cleaning device includes a washing mode and a dehydration mode; and
said winding switching module is configured to control said winding units in said three-phase winding to be connected in series in the washing mode, and to control said winding units in said three-phase winding to be connected in parallel in the dehydration mode.

3. The motor drive system according to claim 1 wherein:
said parallel control module includes three parallel-connected switch units and a first isolation switch unit;
one end of each of said parallel-connected switch units is connected to a corresponding winding and a connection terminal of said motor drive module, and another end of said parallel-connected switch unit is connected to another end of said series-connected switch unit of a corresponding winding; and
two ends of said first isolation switch unit are respectively connected to two ends of said isolation unit.

4. The motor drive system according to claim 3, wherein said parallel control module includes a second isolation switch unit, one end of said second isolation switch unit is connected to a common terminal of said three-phase winding, and another end of said second isolation switch unit is connected to said first isolation switch unit.

5. The motor drive system according to claim 4, wherein said series-connected switch units, said parallel-connected switch units, said first isolation switch unit, and said second isolation switch unit are electronic switches or relays.

6. The motor drive system according to claim 1, wherein each of said winding units includes one coil or a plurality of coils connected in series.

7. The motor drive system according to claim 1, wherein said motor has a periphery and a stator, and said winding switching module is mounted to said periphery in a vicinity of a side of said stator or is mounted to said stator.

8. The motor drive system according to claim 1, which further comprises solder joints disposed on said winding switching module, said three-phase winding having taps each being soldered to a corresponding one of said solder joints.

9. The motor drive system according to claim 8, which further comprises slots provided on said winding switching module, a respective one of said taps being embedded in each of said slots after being soldered to a corresponding one of said solder joints.

10. The motor drive system according to claim 9, wherein said slots are in a one-to-one correspondence with said solder joints.

11. The motor drive system according to claim 8, which further comprises vias provided on said winding switching module, each respective tap passing through one of said vias and being soldered to a corresponding one of said solder joints.

12. The motor drive system according to claim 1, which further comprises a winding switching control module connected to said controller and to said winding switching module, said winding switching control module configured to obtain the operating mode of the laundry cleaning device from said controller and to send a connection instruction to said winding switching module based on the operating mode to control the type of connection of said winding units in said three-phase winding.

* * * * *